United States Patent
Khan et al.

(10) Patent No.: US 8,055,561 B1
(45) Date of Patent: Nov. 8, 2011

(54) APPLICATION TRANSACTION BASED INFRASTRUCTURE CHARGEBACK MODEL

(75) Inventors: Sameer Akbar Khan, Overland Park, KS (US); Nasir Mahmood Mirza, Overland Park, KS (US); Usman Mohammed Naim, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2329 days.

(21) Appl. No.: 10/983,850

(22) Filed: Nov. 8, 2004

(51) Int. Cl.
*G06Q 40/00* (2006.01)

(52) U.S. Cl. .......... 705/35; 705/1; 705/51; 705/52; 705/64; 705/79; 707/100; 707/200

(58) Field of Classification Search ........... 705/1–79; 707/100, 200
See application file for complete search history.

(56) References Cited

U.S. PATENT DOCUMENTS

| | | | | |
|---|---|---|---|---|
| 6,671,818 | B1 * | 12/2003 | Mikurak | 714/4 |
| 6,795,830 | B1 * | 9/2004 | Banerjee et al. | 707/200 |
| 7,124,101 | B1 * | 10/2006 | Mikurak | 705/35 |
| 2005/0071348 | A1 * | 3/2005 | Laicher et al. | 707/100 |
| 2005/0080696 | A1 * | 4/2005 | Bagchi et al. | 705/35 |

* cited by examiner

*Primary Examiner* — Pierre Eddy Elisca
*Assistant Examiner* — Shahid Kamal

(57) ABSTRACT

A system and method for determining the cost per unit transaction for running an application on a server system is disclosed. The total transaction capacity of a system is determined as well as the total storage capacity during a time period M. The total fixed cost and the total variable cost during the time period are also determined. A total cost per unit transaction is determined from the total transaction capacity plus the total storage capacity divided by the total fixed and variable costs. The resource usage of the system by the application is tracked during the time period M. The cost billed to the application user is the resource usage of the application multiplied by the total cost per unit time for the time period M.

13 Claims, 2 Drawing Sheets

US 8,055,561 B1

APPLICATION TRANSACTION BASED INFRASTRUCTURE CHARGEBACK MODEL

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of application deployment, and in particular, to a chargeback method for tracking infrastructure cost at a transaction level.

2. Description of the Prior Art

The cost for using an application program typically must include a portion of the hardware cost. The hardware cost generally contains a host cost and a storage cost. In many instances these hardware costs are billed to the user of the application using a "fixed cost" method. The Fixed cost method may not accurately account for the use of the CPU time or the use of the storage capacity of the system. The total cost for purchasing an application is also typically paid up-front by the user. In a corporate environment, an individual business unit may be unable to justify the total cost for purchasing the application even when the corporate wide demand for the application would justify the cost.

Therefore there is a need for a better method for tracking system resource usage and determining the actual cost per use such that a more accurate business decision can be made to determine the cost effective use of an application.

SUMMARY OF THE INVENTION

A system and method for determining the cost per unit transaction for running an application on a server system is disclosed. The total transaction capacity of a system is determined as well as the total storage capacity during a time period M. The total fixed cost and the total variable cost during the time period are also determined. A total cost per unit transaction is determined from the total transaction capacity plus the total storage capacity divided by the total fixed and variable costs. The resource usage of the system by the application is tracked during the time period M. The cost billed to the application user is the resource usage of the application multiplied by the total cost per unit time for the time period M.

DETAILED DESCRIPTION OF THE PREFERRED EMBODIMENT

Figure 1:
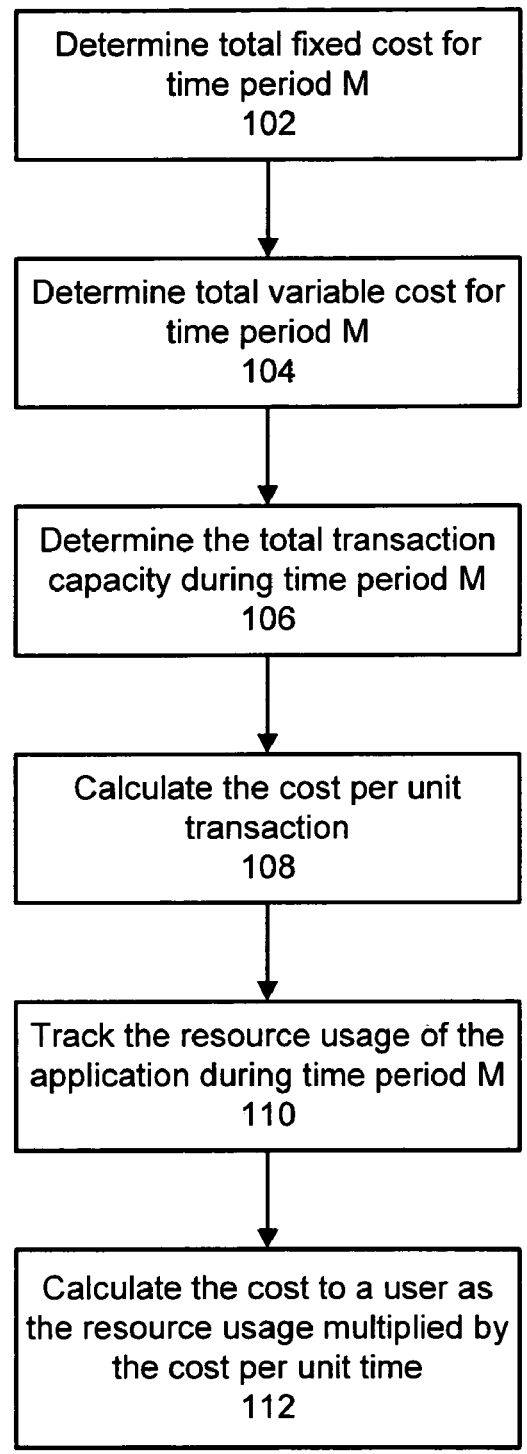
FIG. 1 is a flow chart of a method used to determine the cost to a user for running an application during a time period in an example embodiment of the invention.
Figure 2:
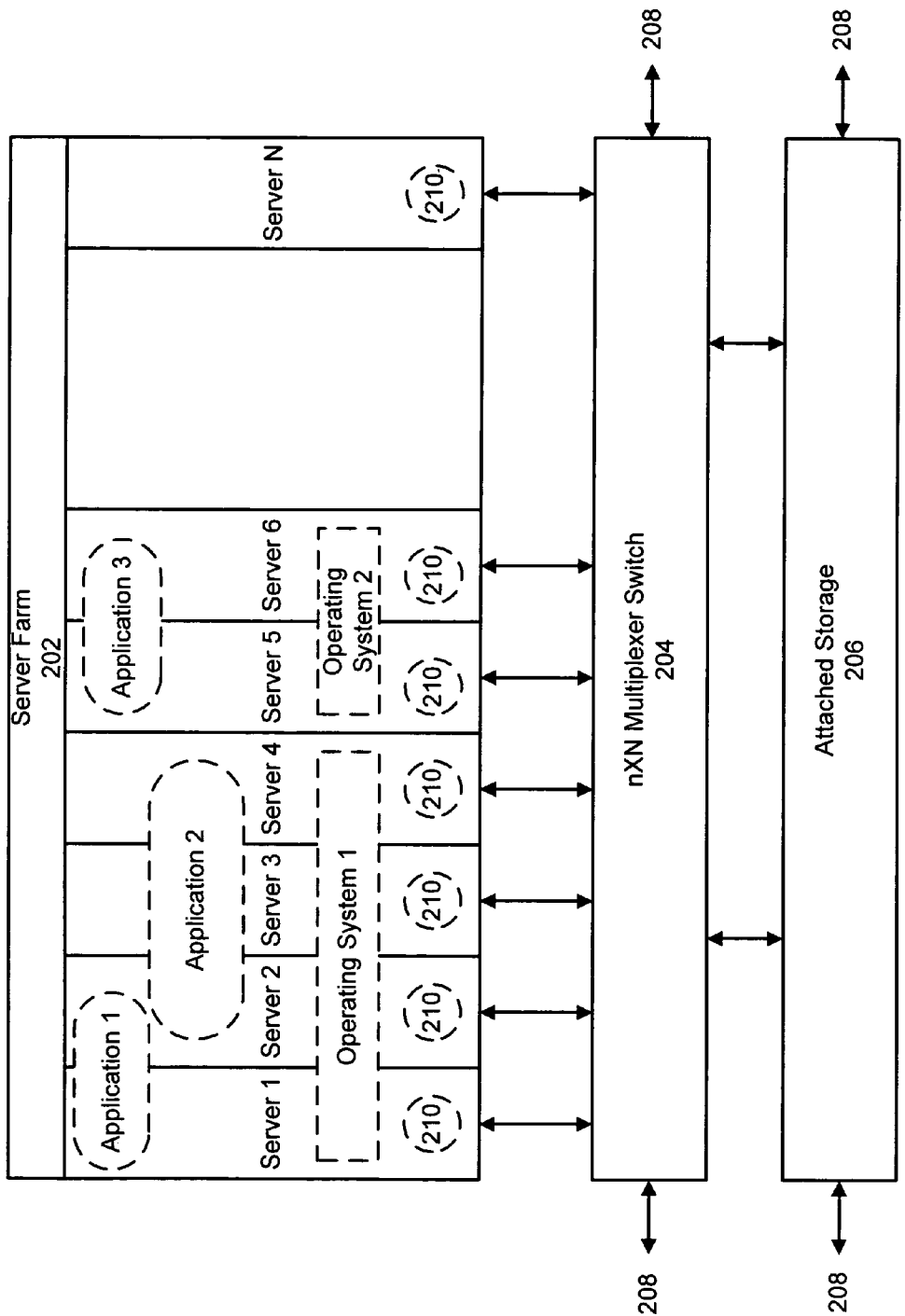
FIG. 2 is a block diagram of a server system used in an example embodiment of the invention.

FIGS. 1-2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

In a distributed corporate environment, individual business units or entities may have a need for an application program that is not currently available on the corporate computer system. The IT department running the corporate computer system typically must charge the individual business unit the total cost of the application, as well as a percentage of the fixed cost of the computer systems, before loading the application onto the computer system. The individual business unit may be unable to justify the up-front cost for the application. There may be enough total demand, corporate wide, for the application even when the usage from a single business unit may not justify the up-front cost to the business unit. Under the current management constraints, the application program would not be acquired and installed until a single business unit paid the purchase costs.

In one example embodiment of the current invention, a usage model that only bills the individual business units for the amount of hardware and software costs used by the application program, may allow acquisition of application programs that could not be justified under the other business models. FIG. 1 is a flow chart of a method used to determine the cost to a user for running an application during a time period in an example embodiment of the invention. At step 102 the total fixed cost for the computer system that will be running the application over a time period M, is determined. At step 104 the total variable cost for the computer system is determined for the same time period M. At step 106 the total transaction capacity of the system is determined for the time period M. In step 108 the cost per transaction is calculated as the sum of the costs (fixed and variable) divided by the transaction capacity, for the time period M. The amount of system resources, in transactions, used by the application is tracked during the time period M (Step 110). The total cost for running the application is the system resource transactions used by the application multiplied by the cost per transaction (step 112). The cost determined in step 110 could be calculated and billed for each user that made use of the application program.

In one example embodiment of the invention, the fixed cost of a system used in step 102 may not be the fixed cost for all of the distributed computer system. For example, some applications may require significant storage capacity, or real time access to large amounts of data. Other applications may require high end computational speeds. The cost for these specialized hardware components may not be included in the fixed costs for an application program that does not use them. The cost of these specialized hardware components would be included in the total system cost for applications that did use the specialized hardware components. In another example embodiment of the invention, the fixed cost of a system used in step 102 will be the fixed cost for all of the distributed computer system. The costs for the fixed expenses may include, but is not limited to, the cost of the following items: the server cost, the storage cost, the operating system license cost, other software cost, the network cost, data center space (rent), and the like.

The variable costs are typically costs that change from month to month. For example, the server support cost, the storage support cost, software support cost, data center cost (power and cooling), operational cost, installation costs, and the like.

The total transaction capacity of the system may be determined using any of a number of different capacity measurements. For example, by determining the number of execution cycles in the different CPU's in the system, by determining the clock speed and number of clock cycles per instruction, by determining how many data items can be processed per unit time, by using the total computational time available (time available per processor multiplied by the total number of processors), and the like. The time period M can be set to any amount. Typically the time period will be set to correspond to a billing cycle, for example one month. However as the distributed usage model for applications spreads beyond the internal corporate environment, the billing cycles may be shortened to an hour, a day, a week, or the like. The time period M may also be changed such that it corresponds to the time during which each application is used.

FIG. 2 is a block diagram of a server system that could be used in an example embodiment of the invention. Server farm 202 has a plurality of blades or servers numbered 1-N. In one example embodiment the maximum number of blades in one server farm may be 1024. Multiple server farm may be grouped together to increase the capacity of the system. In one example embodiment, the blades may contain at least 4 Intel 64 bit processors, 8 GB of memory, 72 GB of internal disk storage, and an optical OC-n ATM interface. The plurality of blades are connected to a n×N multiplexing switch 204. The n×N multiplexer switch is connected to attached storage 206. The n×M multiplexer switch is also connected to a LAN or WAN through connections 208. In one example embodiment the n×N multiplexing switch is a n×N intelligent multiplexer ATM switch. The attached storage may also be connected to the LAN or WAN through connections 208. In one example embodiment of the invention, the attached storage is ATM based network attached storage. Different blades in server farm 202 may be running different operating systems, for example blades 1-4 may be running operating system 1 and blades 5-6 may be running operating system 2. There may be more that one group of blades running a given operating system, for example blades 1-4 may be running HP-UX and blades 25-40 (not shown) may also be running HP-UX. The different operating systems may include HP-UX, IBM-AIX, LINUX, Sun-Solaris, Windows, and the like. One or more applications may be running on each group of blades running a given operating system. Transaction meter 210 tracks the number of server transaction for each blade, for each application running on the blade. Transaction meter 210 may be software integrated into the operating system, software running on the operating system, a combination of software and hardware attached to the blade being monitored, a combination of the above, or the like.

In one example embodiment of the invention, the program that calculates the cost for the usage of the applications running on the server farm may itself be running on the server farm as one of the applications. In another example embodiment the program may be running on an external device that has access to the data generated by the transaction meters. In another embodiment, the program that calculates the cost for running programs on the server farm may be integrated into the operating system of the server farm or the n×N switch. In one example embodiment, the program that calculates the cost for the usage of the applications running on the server farm may be called a billing module or billing unit.

In one example embodiment of the invention, a server may be running three programs A, B, and C. Program A is being run by the finance group, program B is being run by the Human Resource (HR) group, and program C is being run by an engineering group. The total transactions for the server are determined and may include the application CPU processes, the I/O traffic and the memory accesses. These may be benchmarked by the IT group or the specifications for each system may be used to determine the total transactions. The transactions per second (TPS) may be determined for each server system and is equal to the total transactions for the server divided by the total time the server was available for use. The total TPS for all the systems is equal to the net TPS. The resource usage (RU) for each software application A, B, and C will be tracked as a function of time. The percent resource usage (RU %) for an application is equal to the RU divided by the total available system time or RU %=RU/(total available time). The chargeback total (CBT) for each application is the percent resource usage for the application multiplied by the net TPS or CBT=(RU %)(net TPS). The amount billed to each application user, the usage cost (UC), is the CBT for the application multiplied by the cost per TPS or (UC)=(CBT)($/TPS). The cost per TPS is equal to the total cost of the system divided by the net TPS. The storage cost (SC) is added to the usage cost for a total cost (TC) or TC=UC+SC. The storage cost is determined by periodically measuring the storage usage per application (in mbytes) multiplied by the cost per mbytes. The cost per mbyte is the cost to install, maintain, and manage the storage area divided by the total storage capacity.

We claim:

1. A method for calculating a cost for running an application for a user, comprising:
    determining a total fixed cost for running the application on a computer system over a time period m;
    determining a total variable cost for running the application on the computer system over the time period m;
    determining a total transaction capacity for the computer system over the time period m;
    calculating a cost per unit transaction for running the application on the computer system, during the time period m, as a function of the total fixed cost, the total variable cost and the total transaction capacity of the computer system;
    tracking a computer system resource usage, in unit transactions, of running the application on the computer system, during the time period m;
    calculating a cost for running the application on the computer system, during the time period m, as a function of the unit transaction system resource usage and the cost per unit transaction.

2. The method of claim 1 where the fixed cost for running the application on the computer system comprises:
    the server cost;
    the storage cost;
    the operating system license cost;
    the network cost.

3. The method of claim 1 where the variable cost for running the application on the computer system comprises:
    the server support cost;
    the storage support cost;
    the software support cost;
    the data center support cost; and
    the operational cost.

4. The method of claim 1 where the time period m is one month.

5. The method of claim 1 where the cost for running the application is billed to the user of the application program.

6. The method of claim 1 where the unit transaction is a function of the total computational time available.

7. A computer system for calculating a cost for running an application for a user comprising:
- a server farm having a plurality of blades;
- a n×N multiplexer switch configured to interconnect the plurality of blades in the server farm, the n×N multiplexer switch connected to a network;
- an attached storage unit connected to the n×N multiplexer switch;
- a plurality of transaction meters configured to track the execution of application programs running on the plurality of blades;
- a billing module configured to perform the following steps;
    - determining a total fixed cost for running the application on the computer system over a time period m;
    - determining a total variable cost for running the application on the computer system over the time period m;
    - determining a total transaction capacity for the computer system over the time period m;
    - calculating a cost per unit time for running the application on the computer system, during the time period m, as a function of the total fixed cost, the total variable cost and the total transaction capacity of the computer system;
    - tracking a computer system resource usage, in unit times, of running the application on the computer system, during the time period m;
    - calculating a cost for running the application on the computer system, during the time period m, as a function of the unit time system resource usage and the cost per unit time.

8. The computer system of claim 7 where each blade comprises:
- a plurality of processors;
- onboard memory;
- an onboard hard disc storage;
- an OC-n ATM interface.

9. The computer system of claim 7 where the plurality of blades are using a plurality of operating systems.

10. The computer system of claim 9 where one of the operating systems used is selected from the group: HP-UX, IBM-AIX, LINUX, Sun-Solaris, and Windows.

11. The computer system of claim 9 where the plurality of blades are divided into a plurality of partitions and at least one partition is running a plurality of applications.

12. The computer system of claim 9 where the billing module is an application running on the server farm.

13. The computer system of claim 9 where the billing module is part of an operating system that controls the server farm.

* * * * *